Patented Sept. 17, 1940

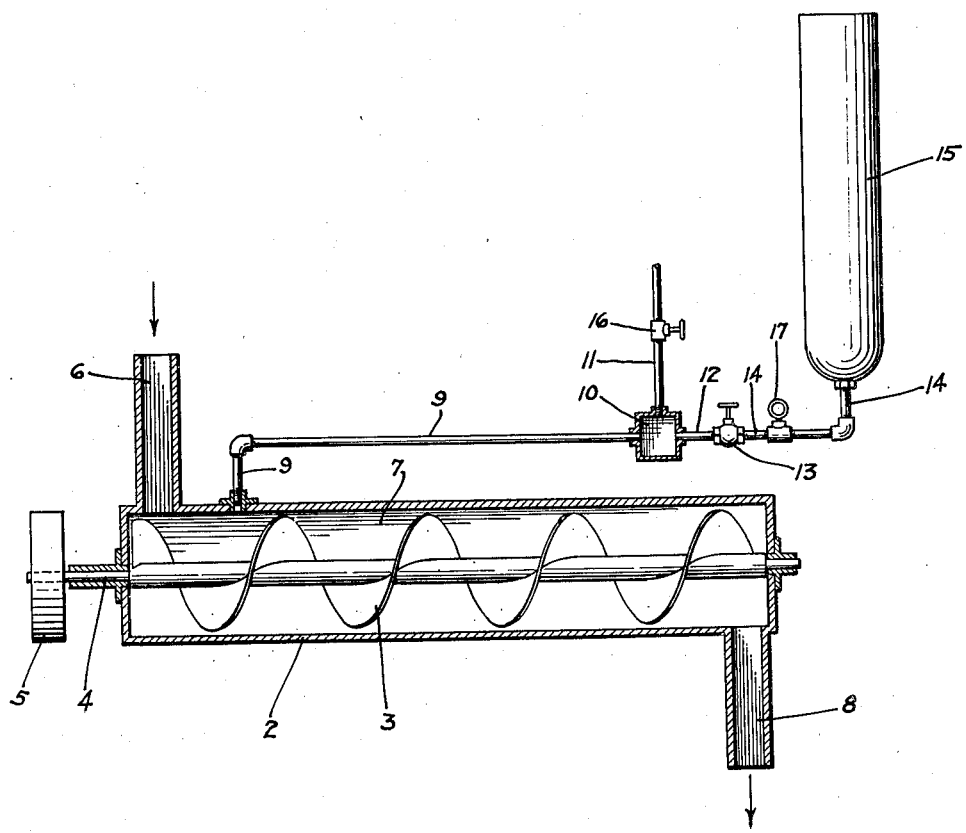

2,215,168

UNITED STATES PATENT OFFICE 2,215,168

PROCESS OF COLORING WHEAT PRODUCTS

Anderson W. Allred, Rush City, Minn.

Application March 10, 1933, Serial No. 660,277

3 Claims. (Cl. 99—148)

This invention relates to an improved process of coloring durum wheat products.

In the manufacture of spaghetti, vermicelli, macaroni, and other similar products made from semolina and durum flour, and commonly known to the trade as alimentary pastes, color is of prime importance. The desired color is the natural color of the durum wheat before milling, or a clear amber. In some instances, the resultant product may have substantially the desired natural color of the wheat, without actually treating the material for color, but such results can be obtained only when the wheat used is of the highest grade and quality, and in which, substantially every wheat berry has fully matured before milling, so that it will have attained its natural amber color. To obtain such a high quality of wheat is practically impossible without hand picking, because in all runs of wheat, no matter how carefully they may have been graded, there is always present a small percent of immature wheat berries and culls, which greatly affect the color of the resultant product. Attempts have therefore been made at coloring alimentary paste products, but heretofore have necessitated the use of artificial coloring matter or vegetable dyes which are intermixed with the pastes or doughs during the process of manufacturing the product. Such artificial coloring of alimentary paste products is undesirable and in many instances is a violation of the pure food laws.

It is therefore highly desirable that means be provided for treating the product during the manufacture thereof, whereby the use of artificial coloring matter may be dispensed with, and whereby the natural color of the wheat berry is restored and so intensified that the color of the resultant product will be substantially the same as the natural color of the wheat, or a clear amber, and will be substantially translucent.

It is now common to use chemicals in the process of milling wheat for flour, for the purpose of destroying color and to bleach the product, but to the best of my knowledge it is new to restore, or bring out and intensify in the product, the natural color of the wheat, so that the resultant product will have the desired color without the use of artificial coloring matter.

An important object of the present invention therefore is to provide an improved process for treating wheat and wheat products whereby the desired color for the finished product may be obtained without the use of artificial coloring matter.

A further object is to provide an improved process of coloring durum wheat products, which consists in passing the material to be treated through a chamber and agitating it, and introducing into said chamber a suitable chemical, such as ammonia or an ammonia compound, having the inherent characteristic of bringing out and intensifying in said product, the natural color of the wheat.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

To illustrate the invention, I have diagrammatically shown in the drawing, a conventional apparatus comprising a casing 2 having a suitable agitator 3 mounted therein and provided with a shaft journaled in suitable bearings at the end walls of the casing 2. A suitable pulley 5 is shown secured to the shaft 4, whereby the agitator may be driven from a suitable source of power, not shown.

An intake 6 is provided at one end of the casing 2 through which the material to be treated is fed into the chamber 7 defined by the walls of the casing 2. At the opposite end of the casing, a suitable discharge 8 is provided through which the treated material is discharged from the chamber 2 into a suitable receiving means, not shown. In the process of treating the material to restore the natural wheat color thereto, a suitable chemical compound, such as ammonia is introduced into the chamber 7, preferably adjacent to the intake 6, which chemical has the inherent characteristic of restoring or bringing out and intensifying the natural color of the wheat, so that the resultant product will have a color substantially the same as the natural color of the wheat before milling, or a clear amber. To thus introduce the chemical into the chamber 7, I have shown a pipe 9 having one end communicating with the chamber 7 and its opposite end connected to a suitable settlings chamber 10, which may have a pipe 11 connecting it with a suitable source of steam or water, not shown. In some instances, I have found it desirable to inject moisture into the chamber 7, particularly if the material being processed is very dry, but ordinarily this is not necessary. A valve 16 is provided in the pipe 11 for controlling fluid flow therethrough. A pipe 12 leads from the settlings chamber 10 to one side of a control valve 13, the opposite side of which is shown connected by a pipe 14 to the outlet of a suitable tank 15, in which the chemical is contained under pressure. A suitable pressure gauge 17 is provided in the pipe 14 to indicate the pressure in the tank 15.

During the process of treating the material, the durum wheat or semolina is fed into the chamber 7 through the intake 6, wherein it is constantly agitated by the agitator 3 and conveyed to the discharge end of the chamber where it is discharged through the outlet 8. As the material is conveyed through the chamber, the chemical, in the form of a gas, is introduced into the chamber 7 from the pipe 9, by manipulation of the control valve 13, where it thoroughly mixes with and saturates the material whereby the reaction of the chemical, compound or reagent upon the material brings out and intensifies the natural wheat color.

In actual operation, I have found that by subjecting semolina products to the action of ammonia, or ammonia compounds, the natural color of the wheat will be restored to the product, and the ammonia may be used either as a solid, liquid or gas, with equal results depending upon the nature of the apparatus employed.

I have also discovered that the chemical or ammonia may be introduced into the material at any stage of the milling. It may be applied to the whole wheat before it is ground, or while packing or packaging the flour; it may also be intermixed with the water used for mixing the necessary doughs and pastes; or it may be introduced into the drying chambers wherein the spaghetti and such articles are dried before packaging. Semolina and other durum wheat products treated by the novel process herein disclosed will have a clear amber color, and will be substantially translucent. The usual white specks commonly found in alimentary paste products will also be eliminated by this novel process, whereby the resultant product will be of the highest quality.

I claim as my invention:

1. The process of coloring durum wheat products, which consists in passing the material to be treated through a closed chamber and introducing ammonia gas into the material while passing therethrough, whereby the natural color of the durum wheat will be brought out and intensified in the resultant product.

2. The process of coloring durum wheat products without the use of dyes, which consists in passing the material to be treated through a closed chamber and agitating it therein, and simultaneously introducing ammonia gas into said chamber whereby the natural color of the wheat will be intensified in the resultant product.

3. The process of bringing out and intensifying in durum wheat products the natural color of the wheat, which consists in introducing the product to be treated into a closed chamber, causing said product to move through said chamber and agitating it during its movement, and introducing ammonia gas directly into the product while in said chamber.

ANDERSON W. ALLRED.